(12) United States Patent
Wang et al.

(10) Patent No.: US 8,537,455 B2
(45) Date of Patent: Sep. 17, 2013

(54) DISPLAY DEVICE WITH IMPROVED DISPLAY PERFORMANCE

(75) Inventors: Tzu-Ming Wang, Hsinchu (TW); Lee-Tyng Chen, Hsinchu (TW); Ted-Hong Shinn, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 82 days.

(21) Appl. No.: 13/293,064

(22) Filed: Nov. 9, 2011

(65) Prior Publication Data

US 2012/0062982 A1 Mar. 15, 2012

Related U.S. Application Data

(63) Continuation-in-part of application No. 12/463,288, filed on May 8, 2009, now abandoned.

(51) Int. Cl.
*G02B 26/00* (2006.01)
*G09G 3/34* (2006.01)

(52) U.S. Cl.
USPC .......................................... 359/296; 345/107

(58) Field of Classification Search
USPC .................... 345/85, 107; 359/296
See application file for complete search history.

(56) References Cited

U.S. PATENT DOCUMENTS

| | | |
|---|---|---|
| 2007/0263277 A1 | 11/2007 | Liang et al. |
| 2010/0149628 A1 | 6/2010 | Fan et al. |
| 2010/0165448 A1 | 7/2010 | Sprague |
| 2010/0188731 A1 | 7/2010 | Kanematsu et al. |

FOREIGN PATENT DOCUMENTS

TW 200643531 A 12/2006

*Primary Examiner* — David N Spector
(74) *Attorney, Agent, or Firm* — Chun-Ming Shih

(57) ABSTRACT

A display device includes a first substrate, a second substrate, a plurality of display units and a plurality of partitioning walls. The second substrate is disposed above the first substrate. The display units are disposed between the first substrate and the second substrate, and each of the display units has a dielectric solvent. The partitioning walls are disposed between adjacent display units correspondingly, and a dielectric constant of each of the partitioning walls is less than that of the dielectric solvent adjacent thereto. Because the dielectric constant of the partition walls is less than that of the dielectric solvent adjacent to the partition wall, a capacitance value induced at the partition wall by a driving voltage can be decreased. Thus, crosstalk phenomena can be avoided in the display unit that is not driven.

9 Claims, 1 Drawing Sheet

DISPLAY DEVICE WITH IMPROVED DISPLAY PERFORMANCE

This application is a continuation-in-part (CIP) of U.S. application Ser. No. 12/436,288 filed on May 8, 2009, now abandoned which claims the benefit of priority to Taiwan application No. 098113049 filed Apr. 20, 2009. The entire disclosure of U.S. application Ser. No. 12/436,288 is incorporated herein by reference.

BACKGROUND

1. Field of the Invention

The present invention relates to a display device, and more particularly to a display device with improved display performance.

2. Description of the Related Art

In these days, with the development of science and technology, display devices have been used more and more widely in various electronic products. Furthermore, with light, thin, short, small and portable trend of development of the electronic products, some flexible displays devices that are thin in thickness and flexible appear in the market, such as, a microcup electrophoretic display (EPD) device, a quick response-liquid powder display (QR-LPD) device and an electro-wetting display (EWD) device.

Take the microcup electrophoretic display device for example, which includes a plurality of microcup display units. Each of the microcup display units includes a solvent and a plurality of charged particles dispersed in the solvent. When the microcup electrophoretic display device is driven, a driving voltage that is applied may not only provide an electric field to the microcup display units that are required to drive, but also influence the microcup display units that are not required to drive and adjacent to the microcup display units that are required to drive. As such, the charged particles of the microcup display units that are not required to drive would move improperly. That is crosstalk phenomena. Consequently, grey scale is prone to changing improperly and images are prone to distortion, and thus display performance of the microcup electrophoretic display device may be degraded.

To avoid occurring the crosstalk phenomena between the microcup display units, generally, a distance between adjacent microcup display units should be increased, or a driving threshold voltage should be upgraded. However, a resolution of the microcup electrophoretic display device would be degraded with increasing the distance between adjacent microcup display units. In addition, a response speed of the microcup electrophoretic display device would be lowered with upgrading the driving threshold voltage.

Therefore, a new display device is desired in order to overcome the above-described shortcomings.

BRIEF SUMMARY

The present invention relates to display device that can avoid occurring crosstalk phenomena and improve display performance without influencing a resolution and a response speed.

The present invention provides a display device, which includes a first substrate, a second substrate, a plurality of display units and a plurality of partitioning walls. The first substrate includes a base and a driving array with a plurality of pixel electrodes disposed on the base. The second substrate includes a transparent plate disposed above the first substrate and a transparent electrode disposed between the first substrate and the transparent plate. The display units are disposed between the driving array and the transparent electrode, and each of the display units has a dielectric solvent and locates on corresponding one of the pixel electrodes. The partitioning walls are disposed between adjacent display units correspondingly, and a dielectric constant of each of the partitioning walls is less than that of the dielectric solvent adjacent thereto.

In the display device of the present invention, because the dielectric constant of the partition walls is less than that of the dielectric solvent, when the predetermined display units are driven, the capacitance value induced at the partition walls by the driving voltage can be decreased. Thus, the crosstalk phenomena can be avoided in the display units that are not driven. As such, the display performance of the display device can be improved without influencing the resolution and the response speed.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
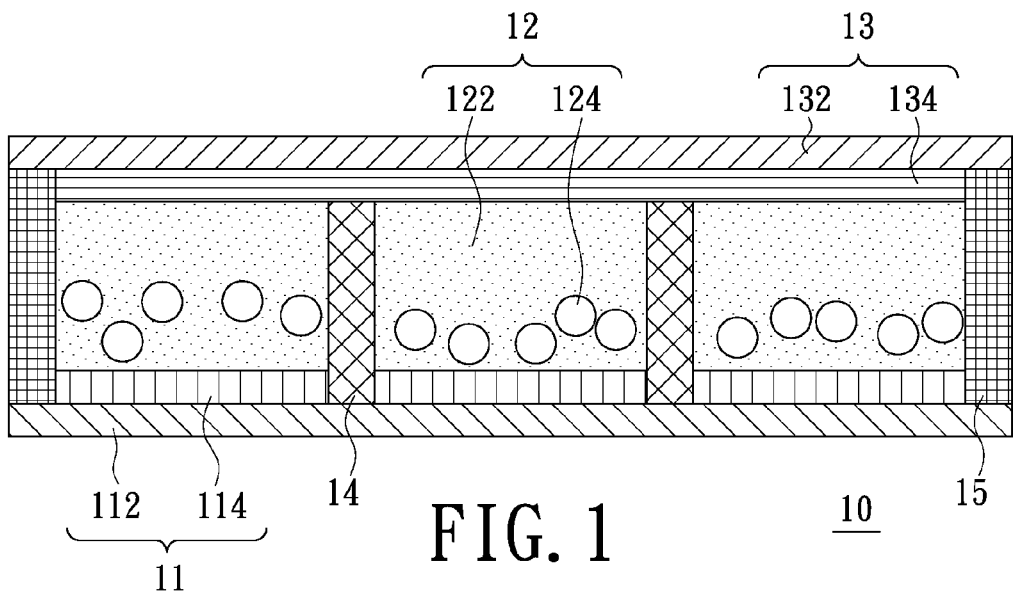
FIG. 1 is a schematic cross-sectional view of a display device according to an exemplary embodiment of the present invention.

FIG. 1 is a schematic cross-sectional view of a display device according to an exemplary embodiment of the present invention. Referring to FIG. 1, the display device 10 is a microcup electrophoretic display (EPD) device for exemplary purposes, but may be other display devices, such as a quick response-liquid powder display (QR-LPD) device and an electro-wetting display (EWD) device. The display device 10 includes a first substrate 11, a plurality of display units 12, a second substrate 13 and a plurality of partitioning walls 14. The second substrate 13 is disposed above the first substrate 11. The display units 12 are disposed between the first substrate 11 and the second substrate 13, and each of the display units 12 has a dielectric solvent 122. The partitioning walls 14 are disposed between adjacent display units 12 correspondingly, and a dielectric constant of each of the partitioning walls 14 is less than that of the dielectric solvent 122 adjacent thereto. In the embodiments of the present invention, the definition of the dielectric constant is set forth by the following formula:

$$\varepsilon_r = \frac{\varepsilon_s}{\varepsilon_0},$$

wherein $\varepsilon_s$ is the static permittivity of the material, and $\varepsilon_0$ is the vacuum permittivity.

It should be appreciated that because the environment condition of the display units 12 can be remained stable and the operating voltage of the display units 12 is also limited in a predetermined range (such as 30V~−30V), thus as the suitable materials of the partitioning walls 14 and the dielectric solvent 122 are selected (set forth in the following paragraphs), the static permittivity $\in_s$ of the partitioning walls 14 and that of the dielectric solvent 122 are determined, so that the value of the dielectric constant $\in_r$ is invariable in display device 10.

In a described embodiment, the first substrate 11 includes a base 112 and a driving array 114 disposed on the base 112 and located between the base 112 and the display units 12. The driving array 114 can be active or passive. For example, the driving array 114 includes thin film transistors array (TFTs array) and pixel electrodes. Material of the base 112 can be selected from the group consisting of glass, polyimide (PI), polyethylene terephthalate (PET), polyethylene naphthalene (PEN), and polymethyl methacrylate (PMMA).

In a described embodiment, the second substrate 13 includes a transparent plate 132 and a transparent electrode 134. The transparent plate 132 is disposed above the display units 12. The transparent electrode 134 is disposed between the display units 12 and the transparent plate 132. Material of the transparent plate 132 can be selected from the group consisting of glass, polyimide (PI), polyethylene terephthalate (PET), polyethylene naphthalene (PEN), and polymethyl methacrylate (PMMA). Material of the transparent electrode 134 can be selected from the group consisting of indium tin oxide (ITO), indium zinc oxide (IZO), zinc oxide (ZnO), and indium gallium zinc oxide (IGZO).

The display units 12 is located between the driving array 114 and the transparent electrode 134, and each of the display units 12 can include a plurality of charged particles 124 dispersed in the dielectric solvent 122. The dielectric solvent 122 is a halogenated hydrocarbon medium, wherein the hydrocarbon medium is selected from a group consisting of halogenated decahydronaphthalene (DECALIN), 5-ethylidene-2-norbornene, fatty oils, paraffin oil, aromatic hydrocarbons such as toluene, xylene, phenylxylylethane, dodecylbenzene, and alkylnaphthalene, and preferably has a low viscosity and a dielectric constant in the range of about 2 to about 30, more preferably about 2 to about 15 for high particle mobility.

When the display units 12 are driven by applying a driving voltage (preferably ranging of 15V~-15) on the driving array 114 and the transparent electrode 134, the charged particles 124 can move toward the driving array 114 or the transparent electrode 134 according to electric property of the charged particles 124, and as such, a brightness of light that passes through the display units 12 can be controlled.

Figure 2:
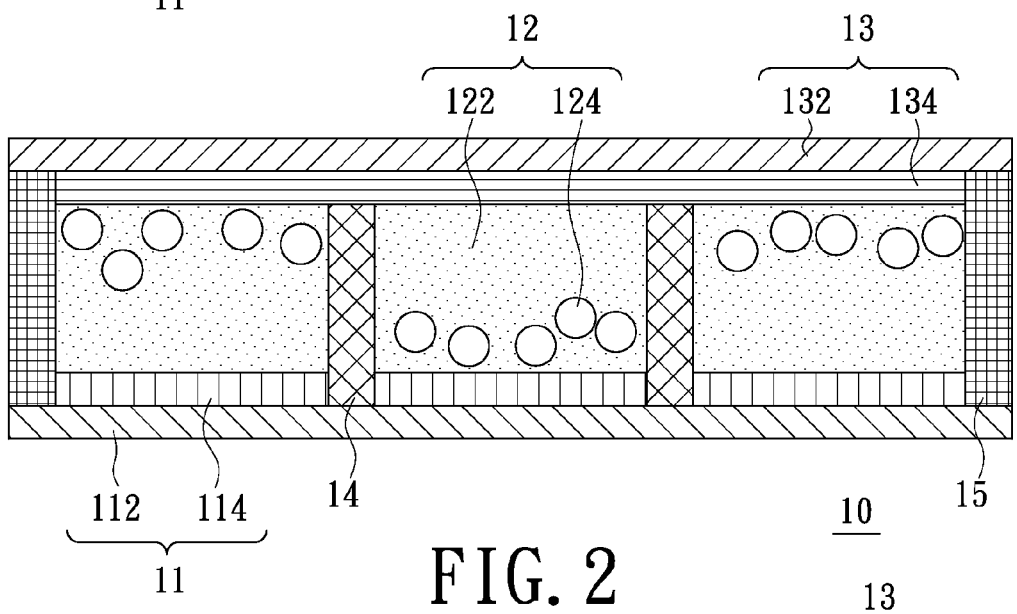
FIG. 2 is a schematic view of the display device of FIG. 1, showing a portion of display units being driven.

The partitioning walls 14 is used to space adjacent display units 12, and the dielectric constant of the partitioning walls 14 is less than that of the dielectric solvent 122. Referring to FIG. 2, because a capacitance value is inversely proportional to a dielectric constant of a medium where an electric field is, when the driving voltage is applied on the driving array 114 and the transparent electrode 134 to drive the display unit 12 located on two sides, the capacitance value induced at the partition walls 14 can be relatively low in comparison with the conventional art, therefore a central display unit 12 that is not driven can avoid occurring crosstalk phenomena. And thus display performance of the display device 10 can be improved without influencing a resolution and a response speed.

In some embodiments of the present invention, the partitioning walls 14 can be made of a liquid or a solid. For example, the partitioning walls 14 are made of material including fluorine (such as fluorine-contained polymer), porous material or polymer. Particularly, to further improve shielding effectiveness of the partitioning walls 14, fluorine-contained polymer (CHCF3)n) is selected to form the partitioning walls 14 and a halogenated toluene medium is selected for serving as the dielectric solvent 122, whereby the dielectric constant of the partitioning walls 14 can be less than a half of that of the dielectric solvent 122. For example, the dielectric constant of the partitioning walls 14 is less than 4.

Figure 3:
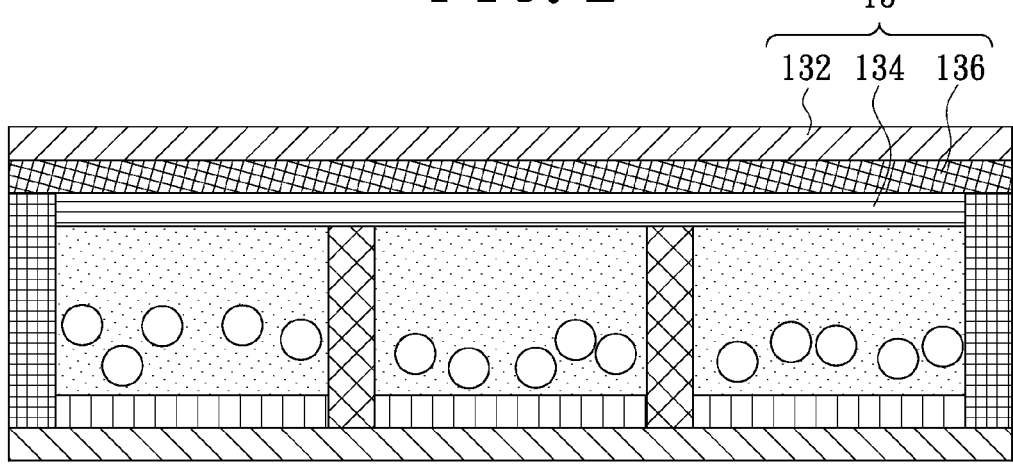
FIG. 3 is a schematic cross-sectional view of a display device according to another exemplary embodiment of the present invention.

In addition, referring to FIG. 1 again, the display device 10 can further include a sealant 15 located between the first substrate 11 and the second substrate 13 and formed around the display units 12. The sealant 15 is used to seal the display units 12 between the first substrate 11 and the second substrate 13. Furthermore, to make the display device 10 be a color display device, the second substrate 13 can further includes a color filter 136 disposed between the transparent plate 132 and the transparent electrode 134, as shown in FIG. 3.

In summary, in the display device of the present invention, because the dielectric constant of the partition walls is less than that of the dielectric solvent, when the predetermined display units are driven, the capacitance value induced at the partition walls by the driving voltage can be decreased. Thus, the crosstalk phenomena can be avoided in the display units that are not driven. As such, the display performance of the display device can be improved without influencing the resolution and the response speed.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A display device, comprising:
a first substrate comprising:
a base; and
a driving array with a plurality of pixel electrodes disposed on the base;
a second substrate comprising:
a transparent plate disposed above the first substrate; and
a transparent electrode disposed between the first substrate and the transparent plate;
a plurality of display units disposed between the driving array and the transparent electrode, wherein each of the display units has a dielectric solvent and a plurality of charged particles dispersed in the dielectric solvent and is located on corresponding one of the pixel electrodes; and
a plurality of partitioning walls made of fluorine-contained polymer of (CHCF3)n) and disposed between adjacent display units correspondingly, wherein a dielectric constant of each of the partitioning walls is less than 4.

2. The display device as claimed in claim 1, wherein the partitioning walls are made of a liquid or a solid.

3. The display device as claimed in claim 1, wherein the partitioning walls are made of material including fluorine, porous material or polymer.

4. The display device as claimed in claim 1, wherein the dielectric solvent is a halogenated hydrocarbon medium, and the hydrocarbon medium is selected from a group consisting of halogenated decahydronaphthalene (DECALIN), 5-ethylidene-2-norbornene, fatty oils, paraffin oil, aromatic hydrocarbons such as toluene, xylene, phenylxylylethane, dodecylbenzene, and alkylnaphthalene.

5. The display device as claimed in claim 1, wherein the dielectric constant of each of the partitioning walls is less than a half of that of the dielectric solvent adjacent thereto.

6. The display device as claimed in claim 5, wherein material of the base is selected from the group consisting of glass, polyimide, polyethylene terephthalate, polyethylene naphthalene, and polymethyl methacrylate.

7. The display device as claimed in claim 1, wherein the second substrate further comprises a color filter disposed between the transparent plate and the transparent electrode.

8. The display device as claimed in claim 7, wherein material of the transparent electrode is selected from the group consisting of indium tin oxide, indium zinc oxide, zinc oxide, and indium gallium zinc oxide.

9. The display device as claimed in claim 7, wherein material of the transparent plate is selected from the group consisting of glass, polyimide, polyethylene terephthalate, polyethylene naphthalene, and polymethyl methacrylate.

* * * * *